US009208246B2

(12) United States Patent
Mercuri et al.

(10) Patent No.: US 9,208,246 B2
(45) Date of Patent: Dec. 8, 2015

(54) CONTENT DISTRIBUTION USING EMBEDDABLE WIDGETS

(75) Inventors: Marc E. Mercuri, Bothell, WA (US); James O. Tisdale, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 644 days.

(21) Appl. No.: 12/732,208

(22) Filed: Mar. 26, 2010

(65) Prior Publication Data

US 2011/0238688 A1    Sep. 29, 2011

(51) Int. Cl.
    G06F 7/00       (2006.01)
    G06F 17/30      (2006.01)
    G06Q 30/00      (2012.01)
    G06F 3/00       (2006.01)
    G06Q 30/02      (2012.01)
    H04B 1/18       (2006.01)

(52) U.S. Cl.
    CPC ............ *G06F 17/3089* (2013.01); *G06Q 30/02* (2013.01)

(58) Field of Classification Search
    None
    See application file for complete search history.

(56) References Cited

U.S. PATENT DOCUMENTS

| 2005/0033657 | A1* | 2/2005 | Herrington et al. ............. 705/26 |
| 2006/0218488 | A1* | 9/2006 | Shah et al. ................... 715/516 |
| 2007/0156594 | A1  | 7/2007 | McGuicken |
| 2008/0070526 | A1* | 3/2008 | Donahue .................... 455/187.1 |
| 2009/0030784 | A1  | 1/2009 | Goyal et al. |
| 2009/0089162 | A1  | 4/2009 | Davis et al. |
| 2009/0119592 | A1* | 5/2009 | Boerner ........................ 715/716 |
| 2009/0157491 | A1  | 6/2009 | Brougher et al. |
| 2009/0192860 | A1  | 7/2009 | Heller et al. |
| 2009/0265257 | A1  | 10/2009 | Klinger et al. |
| 2011/0106784 | A1* | 5/2011 | Terheggen et al. ........... 707/706 |

FOREIGN PATENT DOCUMENTS

| KR | 10-2007-0118909 | 12/2007 |
| KR | 10-2010-0001923 | 1/2010 |
| WO | 2009139869 A1 | 11/2009 |

OTHER PUBLICATIONS

"The Business Network Transformation of the Media Industry", Retrieved at << http://www.sap.com/about/vision/pdf/FTI1878_evolve_bus_netwrk_wp_v1.pdf >>, 2008, pp. 7.

(Continued)

*Primary Examiner* — James Trujillo
*Assistant Examiner* — Cheryl M Shechtman
(74) *Attorney, Agent, or Firm* — Casandra Swain; Danielle Johnston Holmes; Micky Minhas

(57) ABSTRACT

A content distribution system allows authors to freely syndicate their content to content distributors in a way that ensures that the author receives appropriate credit for the impact of the content upon readers. The system provides an embeddable control that publishers can embed in a web site or other distribution channel. Authors provide the content displayed within the embeddable control and can include advertisements as well as any content restrictions. For advertisers, the system allows them to advertise with the content instead of the publisher, and allows them to do so in all of the venues that host the content. This places control of monetization of content back in the hands of the author, and incentivizes the author to maximize the distribution of his content to reach the widest possible audience rather than to hoard content at his own site.

11 Claims, 5 Drawing Sheets

(56) References Cited

OTHER PUBLICATIONS

"Eight Models Emerge for Digital Content Monetization", Retrieved at << http://resources.socohanoi.com/eight-models-emerge-for-digital-content-monetization/ >>, Nov. 23, 2009, pp. 2.

Rosenberg, Dave, "What is the Most Appealing Disruptive Software Business Model?", Retrieved at << http://news.cnet.com/8301-13846_3-9810770-62.html , Nov. 5, 2007, pp. 2.

"Monetizing Online Content", Retrieved at << http://quaero.csgsystems.com/insight/blog/99-monetizing_online_content , Jul. 10, 2009, pp. 2.

"International Search Report", Mailed Date: Nov. 28, 2011, Application No. PCT/US2011/029109, Filed Date: Mar. 18, 2011, pp. 8.

"Supplementary European Search Report Issued in European Patent Application No. 11759961.3", Mailed Date: Nov. 20, 2014, 7 Pages.

* cited by examiner

CONTENT DISTRIBUTION USING EMBEDDABLE WIDGETS

BACKGROUND

The Internet is filled with many different types of content, such as text, video, audio, and so forth. Many sources produce content, such as traditional media outlets (e.g., news sites), individual bloggers, retail stores, manufacturers of products, and so forth. Some web sites aggregate information from other sites. For example, using a Really Simple Syndication (RSS) feed, a web site author can make content available for other sites or users to consume, and an aggregating site can consume various RSS feeds to provide aggregated content.

The production of content is time consuming and often costs money. Internet content is monetized in various ways. For example, traditional news sites may pay authors a salary to write articles just as they formerly did for newspapers and other print media. Similarly, a television news station may make audiovisual content available on its website that provides clips of its television shows that are monetized via interstitial ads and/or display ads on the containing page. Individual bloggers often monetize their content by hosting advertisements provided by content-based advertising providers. For example, a blog author may reserve a fixed size rectangle on a portion of his web site and embed an advertising provider's script or control to populate the rectangle with advertisements related to the page content upon access of the page by a reader. This model works well where the content author is displaying the content on a site under her control.

Unfortunately, an author that is an excellent producer of content does not always have the best access to channels for distributing the content. Likewise, distributors of content do not always have access to the best content to distribute. However, authors are often concerned about how to provide content to a distributor (e.g., an aggregation site) in a manner that will allow the author to receive appropriate credit for the content and even to profit from the content through monetary rewards. Once an author's content is displayed on a site that is not under the control of the author, the author also loses control of the advertisements and other revenue streams associated with the content. An author may not trust a distributor to provide the author with a fair share of any revenue derived from the attention and readership that the author's content garners for the distributor. An author may also not want his content shown on a particular site regardless of monetization (e.g., Disney content or political videos on an explicit adult site). Thus, monetizing content on the web is an ongoing concern, particularly for content authors.

SUMMARY

A content distribution system is described herein that allows authors to freely syndicate their content to content distributors in a way that ensures that the author receives appropriate credit for the impact of the content upon readers. The system provides an embeddable control that publishers can embed in a web site or other distribution channel. Authors provide the content displayed within the embeddable control and can include advertisements as well as any content restrictions. The content distribution system empowers content creators to make their content embeddable and have it support both scenarios where the embedding party is a known publisher and those where the embedding party is an unknown publisher. The former supports traditional models, such as news sites and other aggregators, while the latter allows content creators to freely syndicate their content to anyone. For advertisers, the system allows them to advertise with the content instead of the publisher, and allows them to do so in all of the venues that host the content. This places control of monetization of content back in the hands of the author, and incentivizes the author to maximize the distribution of his content to reach the widest possible audience rather than to hoard content at his own site.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
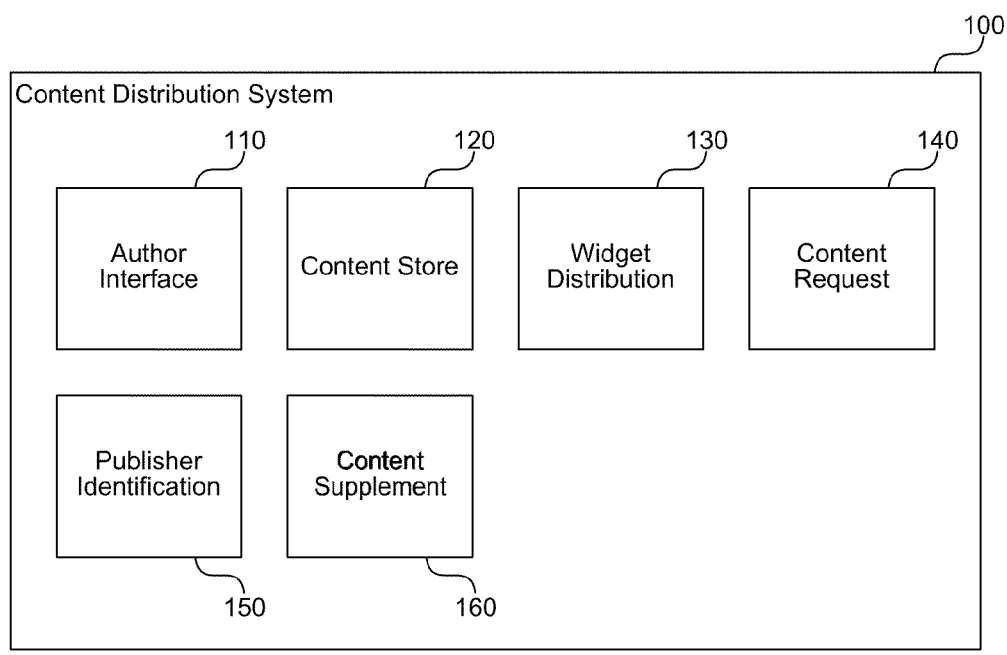
FIG. 1 is a block diagram that illustrates components of the content distribution system, in one embodiment.

A content distribution system is described herein that allows authors to freely syndicate their content to content distributors in a way that ensures that the author receives appropriate credit for the impact of the content upon readers. The system provides an embeddable control that publishers can embed in a web site or other distribution channel. Authors provide the content displayed within the embeddable control and can include advertisements as well as any content restrictions (e.g., who can display the control, where it can be displayed, how many times the content is shown, and so on). The content distribution system empowers content creators to make their content embeddable and have it support both scenarios where the embedding party is a known publisher and those where the embedding party is an unknown publisher. The former supports traditional models, such as news sites and other aggregators, while the latter allows content creators to freely syndicate their content to anyone. For advertisers, the system allows them to advertise with the content instead of the publisher, and allows them to do so in all of the venues that host the content. For example, whereas traditionally an aggregation site would host its own advertisements that would relate generally to the purpose of the site (e.g., a computer information site might host computer sales advertisements), using the content distribution system an advertiser can associate an advertisement with a particular article and display the advertisement wherever the article is displayed. This places control of monetization of content back in the hands of the author, and incentivizes the author to maximize the distribution of his content to reach the widest possible audience rather than to hoard content at his own site. In addition, widespread use of the system will allow readers to find the content they want by visiting fewer sites rather than having to go to the source for everything that they want to consume.

In some embodiments, the content distribution system includes a widget designed for a content author or publisher to syndicate their content to known and unknown affiliates. For known affiliates, the widget can be themed to look as though the widget is part of the known affiliate's site, while unknown affiliates can be shown advertisements and branding. For example, a content author that produces sports articles may have a contract with ESPN.com whereby the author is paid a set amount to produce content for the site on a regular basis. In this scenario, ESPN.com may not wish to display and the author may agree not to display advertisements for an article from the author, but the author may associate and display advertisements when the article is displayed in other scenarios (e.g., when a third party picks up the article and shows it on her sports site). Thus, the content distribution provides the ability for content authors to have flexibility in the way they monetize their content. The ability to monetize content regardless of the content type and regardless of the site in which it is embedded provides value to authors and publishers and may even restore traditional models such as those previously used successfully by newspapers. Using the system, a news or other content-based organization can either focus on becoming the premier distributor (i.e. go to source) for articles on a particular topic written by others or focus on gathering up good authors (e.g., by paying them a salary) to write articles for a distribution to a variety of sources, or both.

The content distribution system provides a mechanism by which to distribute embeddable content with intelligence about the consuming site and with support of multiple monetization models. For sites that are affiliates (with a business relationship in place), the content may be embedded without any user experience information and may appear to be a natural part of the consuming site. For sites that are not affiliates, the content may be displayed with user experience information that includes advertising, branding, or other information selected by the author. The content can be static content, interactive content, or applications.

Although the system provides a great way for advertisers to participate in the community and in conversations broadly, the system also has significant potential for the newspaper industry. A columnist with a major news organization, for example, could syndicate his column to a website of the news organization (which would get his column without user experience information and appear as part of the site), while multiple other individuals could all embed the column in their sites. On those sites, the content would show up with advertisements, with revenue accruing back to the author or the news organization for the column content. The site owners can still make money off advertisements elsewhere on the site (e.g., larger banner or sidebar advertisements).

FIG. 1 is a block diagram that illustrates components of the content distribution system, in one embodiment. The system 100 includes an author interface component 110, a content store 120, a widget distribution component 130, a content request component 140, a publisher identification component 150, and a content supplement component 160. Each of these components is described in further detail herein.

The author interface component 110 provides an interface between an author and the system through which the author can create content and specify settings for how the content can be consumed by one or more publishers. The author interface component 110 may receive various content types from the author and store the content in one or more content stores 120. The author may also specify one or more publishers that can access the content to embed the content within the publishers' own sites, as well as any restrictions that apply to individual publishers or groups of publishers. Restrictions may be based on affiliate relationships between the author and publishers. An example of a restriction may include preventing the publisher from reformatting the content or providing supplemental information along with the content (e.g., advertisements, logos, and so forth) for the publisher to display with the content.

The content store 120 is a data store that provides persistent storage for content created by the author. The content store 120 may include a file system, database, storage area network (SAN), cloud-based storage service, or any other type of storage technology or combination of storage technology that allows the author to store content and publishers to retrieve content in ways allowed by the author. The content store 120 may also comprise multiple content stores (e.g., multiple content databases). For example, in a broker scenario, a broker provides content on behalf of partners and that broker provides an implementation of the content store 120 used by the system 100.

The widget distribution component 130 provides an interface through which publishers can request a widget that displays the author's content and any associated information. For example, the widget distribution component 130 may supply a widget to publishers in the form of an ACTIVEX™ control, MICROSOFT™ SILVERLIGHT™ application, JAVASCRIPT™, ADOBE FLASH™, or other embeddable widget that the publisher can display along with other content. For example, the publisher may publish a web site that aggregates articles and audiovisual content related to a particular topic, and the publisher may embed the widget of one or more authors that write content related to the topic. Publishers may also provide content targeting mobile users, and may distribute mobile content widgets provided by authors for displaying their content in a mobile-friendly format. The widget may also be provided by a third party (e.g., Microsoft or other software company), and each author may create content in a format accessible by the third party widget. Web pages or other content pages can embed the widget along with parameters that specify where to access a particular author's content.

The content request component 140 receives requests to access the author's content from one or more publishers. The publisher may request content when a user accesses the publisher's web site and requests a web page that includes embedded content from the author. The publisher may identify the requested content by a globally unique identifier (GUID) or other tag or identifier that distinguishes one content item from another. The publisher may also specify a generic descriptor, such as a topic, so that the content request retrieves the latest article on a particular topic by the author to place on the publisher's site.

The publisher identification component 150 identifies a publisher associated with a particular content request and performs any specific handling of the request for the identified publisher. For example, an author may specify publisher-specific user experience information, content size requirements, advertisements, or other restrictions or requests that affect how the content is provided to a particular publisher. When the content request component 140 receives a new content request, the component 140 invokes the publisher identification component 150 to determine publisher-specific handling and accesses any information to accompany the content response from the content supplement component 160.

The content supplement component 160 provides supplemental content associated with an author's content in response to a request from a publisher to access content for display on the publisher's site. For example, the content supplement component 160 may provide advertisements for which the author is paid to display or a logo associated with the author so that viewers of the content at the publisher's site will know where the content originated or will pay tribute to the author of the content to compensate the author for creating the content and distributing the content to the publisher. The content supplement component 160 may invoke a third party component or website, such as a third party advertisement network, to retrieve supplemental content to provide in response to a request. The content supplement component 160 or third party component may also provide tracking of where requests for content are originating, so that effectiveness of particular publishers can be tracked and used for improving future relationships with the publisher.

The computing device on which the content distribution system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics (e.g., set-top boxes and gaming consoles), digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
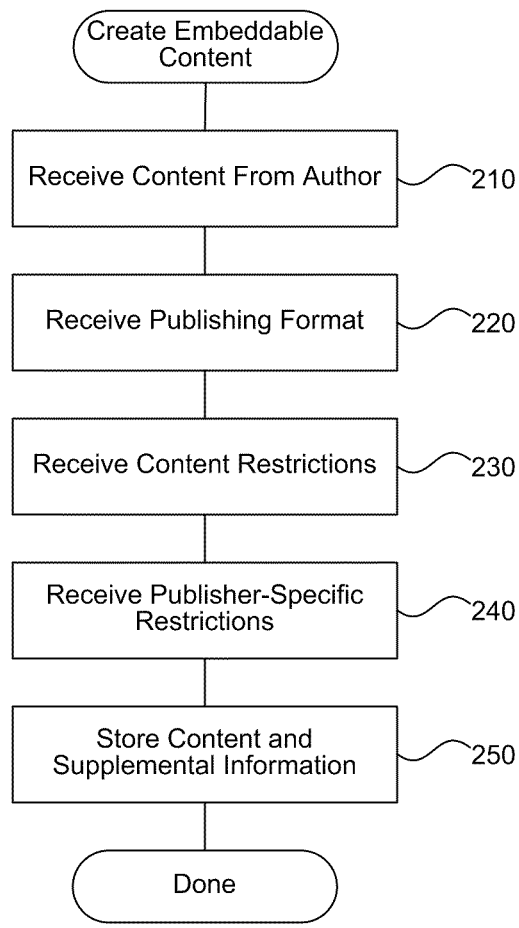
FIG. 2 is a flow diagram that illustrates processing of the author interface component of the content distribution system to receive content from an online content author for distribution to publishers, in one embodiment.

FIG. 2 is a flow diagram that illustrates processing of the author interface component of the content distribution system to receive content from an online content author for distribution to publishers, in one embodiment. Beginning in block 210, the component receives content from the author. For example, the author may use an editing application to create text, audiovisual, or other types of content that the author subsequently would like to publish. The system may include an editing facility, such as a web-based form that the author can use to create content or may receive content externally from a separate application. In some embodiments, the content distribution system may interact with a content management system (CMS) to receive content from authors.

Continuing in block 220, the component optionally receives formatting options for the content from the author. For example, the author may specify a size of rectangle in which the content is to be displayed, font information (e.g., size and text color), placement relative to neighboring content (e.g., stacked vertically or horizontally), and so forth. The type of formatting information received may vary based on the type of content. For example, for text content, the formatting options may include font size and color, whereas for video the formatting options may include available bitrates, display rectangle size, whether full-screen is available, and so forth. The author may specify different formatting options for different publishers, allowing some publishers fewer restrictions (e.g., based on a previous agreement with a publisher). Continuing in block 230, the component receives content restrictions that specify how the content can be published. For example, the author may prefer that his content not appear on offensive sites, and thus may specify that sites of a particular category cannot publish the content. Other restrictions may include where the content can be placed, how close neighboring advertisements of the site can be, and so forth. The author may also specify advertisements or a source from which to retrieve advertisements at publishing time that supplement the content.

Continuing in block 240, the component receives publisher-specific restrictions that specify a difference in how the content can be published for at least one publisher. For example, the author may include his own branding, formatting, and other options for some publishers but allow a publisher to theme content based on the publisher's own site for other publishers. The restrictions may specify a URL associated with the publisher, a previously set identifier given to the publisher by the author, or other means of identifying the publisher when the system receives a request for content. The system matches the received identifier with any identifiers associated with restrictions in the content store. The author may set different restrictions per article or based on a grouping of articles, such as a category.

Continuing in block 250, the component stores the received content and supplemental information in a content store for later retrieval by a publisher. The supplemental information may include the received formatting options, content restrictions, publisher-specific restrictions, advertisements, logos, and other information set by the author. Upon storing the received content, the system may create a content identifier associated with the content that publishers can use to embed and refer to the content for later requests. After block 250, these steps conclude.

Figure 3:
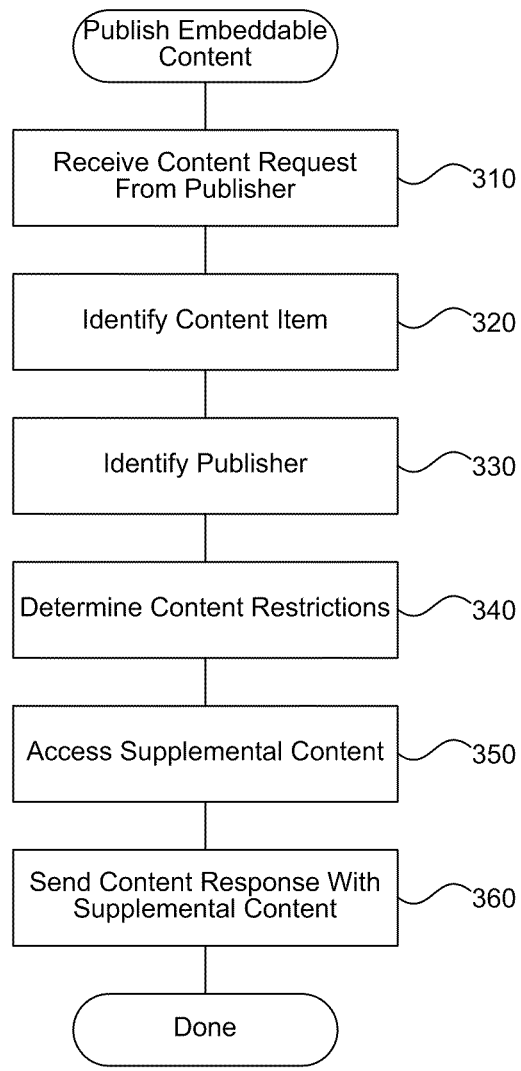
FIG. 3 is a flow diagram that illustrates processing of the content request component of the content distribution system to respond to requests for online content from publishers, in one embodiment.

FIG. 3 is a flow diagram that illustrates processing of the content request component of the content distribution system to respond to requests for online content from publishers, in one embodiment. Beginning in block 310, the component receives a request to access content from a publisher, wherein the request identifies at least one content item. For example, a publisher may embed a widget on a web page of the publisher that, upon preparation for display (such as when a user visits the web page), requests content from a content store where an author has previously stored content. The request may include an identifier that refers to a particular article, audiovisual element, or class of content (e.g., the latest sports article from an author). The content distribution system identifies appropriate matching content and responds to the request in the following steps.

Continuing in block 320, the component identifies a content item stored in a content store that matches the requested content item. For example, one or more authors may store articles or other content in a content database available from the Internet along with identifiers that identify each article. The component searches the store for a matching content item and if one is found, continues with the following steps. If a matching content item is not found, then the component may return an error (not shown) to the requesting publisher.

Continuing in block 330, the component identifies the publisher associated with the received content request. For example, the publisher may include a publisher identifier along with the request (e.g., as an HTTP or other protocol header or as part of the request URL) so that the system can respond appropriately for the particular publisher, such as upholding any prior agreement with the publisher regarding content restrictions. The component may also automatically identify the publisher, such as be examining an Internet Protocol (IP) address from which the request originated or other available information associated with the request. In some embodiments, the content distribution system may encode a publisher identifier in a content identifier provided to the publisher for embedding the content item.

Continuing in block 340, the component determines any restrictions associated with the identified publisher and identified content item. For example, the component may access the content store to identify any content restrictions stored alongside the content item (e.g., in a database table of restrictions that map to publishers and/or articles). The restrictions may indicate supplemental information that will accompany the response to the content request, such as advertisements that the author is paid for displaying or for obtaining clicks upon. Continuing in block 350, the component accesses supplemental information associated with the identified content item to include with a content response. For example, the component may access an advertisement from an advertisement server, a logo from the content store or other source, a background image for the content (e.g., a watermark), or other supplemental information.

Continuing in block 360, the component sends the content response including the identified content item and accessed supplemental information to the requesting publisher. For example, if the request is an HTTP GET request, then the component may provide a standard HTTP response (e.g., 200 OK) that includes the requested content and any supplemental information that the author specifies to accompany the content. Thus, the author retains control of the content, can determine when, how, and by whom it is used, and can be compensated for the content. After block 360, these steps conclude.

Figure 4:
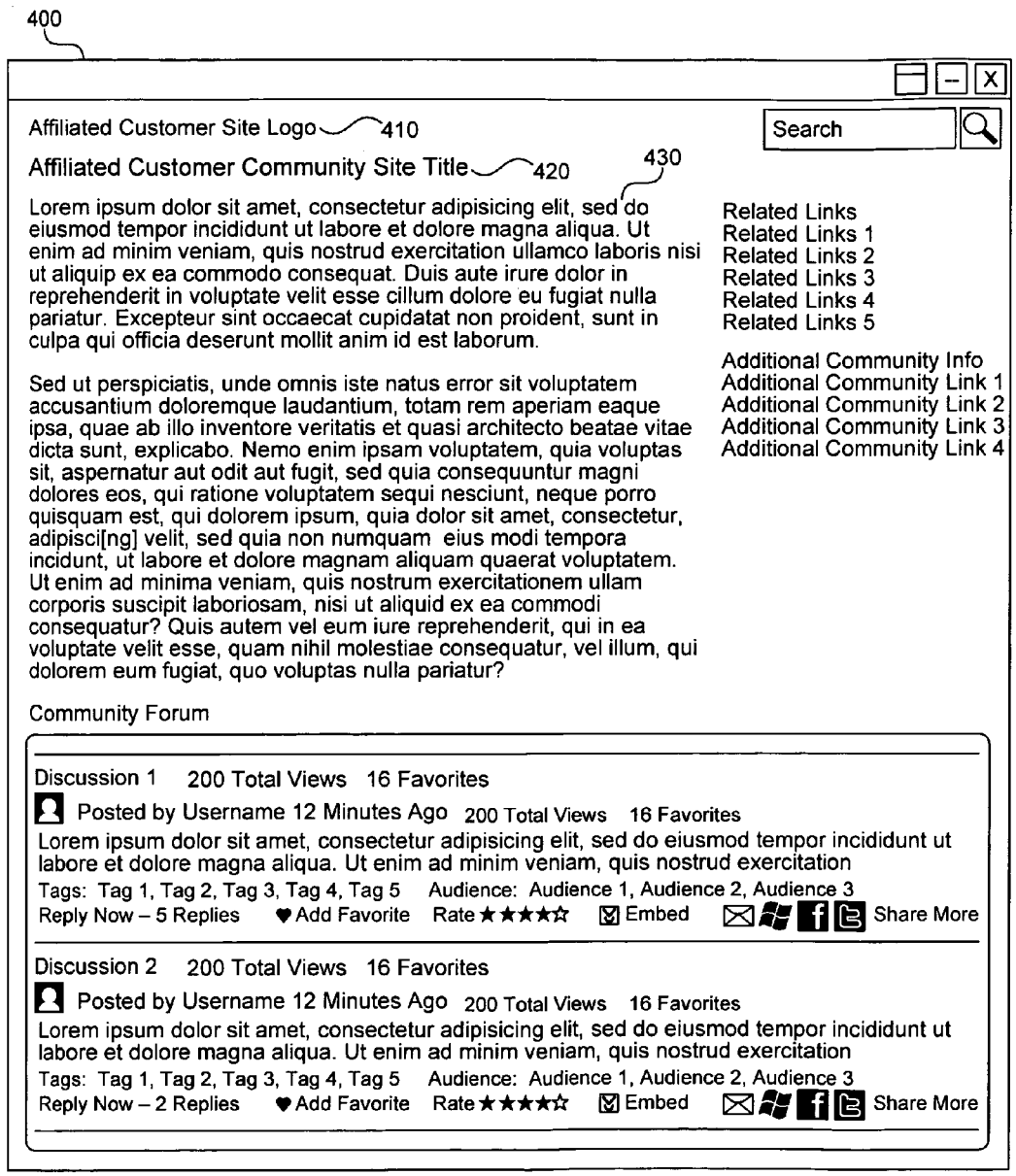
FIG. 4 is a display diagram that illustrates embedded content from an author on an affiliated publisher's site using the content distribution system, in one embodiment.

FIG. 4 is a display diagram that illustrates embedded content from an author on an affiliated publisher's site using the content distribution system, in one embodiment. The display 400 includes a logo 410 branded by the publisher, a title 420 set by the publisher, and article content 430 provided by the author. In this example, the publisher is an affiliate of the author, meaning that some agreement has been reached between the author and publisher to allow the publisher to display the author's content with no or fewer restrictions than non-affiliated publisher. The agreement may also relate to how the publisher compensates the author, such as buying rights to a set number of articles per month for a fixed price or any other financial arrangement reached by the author and publisher. The publisher in this example has the right to display the author's content with the publisher's own user experience, theme, and branding. There is no user experience chrome or advertisement from the author attached to the content. The content shown is forum content, but could be any type of content (video, image, HTML, and so on).

Figure 5:
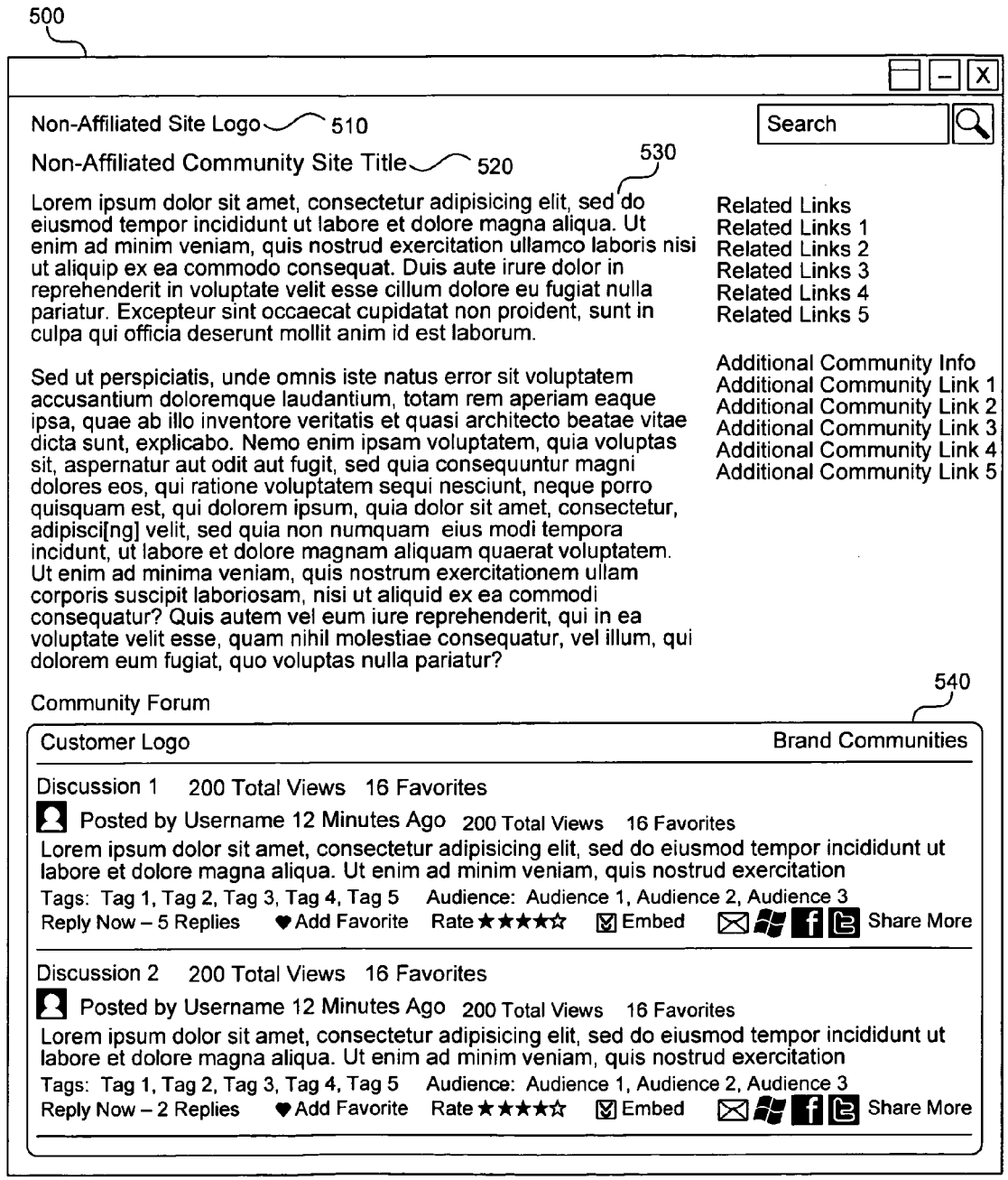
FIG. 5 is a display diagram that illustrates embedded content from an author on a non-affiliated publisher's site using the content distribution system, in one embodiment.

FIG. 5 is a display diagram that illustrates embedded content from an author on a non-affiliated publisher's site using the content distribution system, in one embodiment. The display 500 includes a logo 510 branded by the author, a title 520 set by the author, article content 530 provided by the author, and branding information 540 provided by the author. In this example, the publisher is not an affiliate of the author, so the author provides the content with more restrictions than that of FIG. 4. The author may retain the right to include advertisements, branding, content formatting, and other supplemental information with the content requested by the publisher. This allows the author to retain some control of the content and to be compensated for the content. As with FIG. 4, the content shown is forum content, but could be any type of content (video, image, HTML, and so forth).

In some embodiments, the content distribution system populates content within an embedded widget using calls to a RESTful web service located at a Hypertext Transfer Protocol (HTTP) Uniform Resource Locator (URL). The guidelines of the Representational State Transfer (REST) style of software architecture for distributed hypermedia systems specify that an application can interact with a resource by knowing only the identifier of the resource (e.g., a URI) and the action requested (e.g., retrieval), and without knowing whether there are caches, proxies, gateways, firewalls, tunnels, or anything else between the application and the server actually holding the information. Following REST guidelines allows the system to benefit from existing Internet infrastructure and pre-existing resource conserving techniques such as caching. Some example RESTful principles that the system implements in some embodiments include: each URI identifies exactly one response, each URI points to a server resource that is stateless and cacheable, and each URI is intuitive and uses nouns (verbs are HTTP verbs). Calls to populate a widget with content may incorporate an identifier (e.g., part of the embed string) that identifies the site that is embedding the content. The call to the web service returns a payload that is interpreted by the widget and determines the display and theme of the widget, the display of advertising (if appropriate), and the rendering of content. Themes may specify threshold high and low sizes for the widget, default background color, background image, foreground color, font, and so forth.

In some embodiments, the content distribution system allows advertising display to be customized by the author. For example, the author may specify that advertisements be placed on the top, left, right, or bottom of the widget. In addition a secondary parameter may identify whether the advertisement should be displayed centered or to one of the two sides (left or right, top or bottom). The content owner can specify a flag that requests that the content provider logo be displayed with the content. As with the advertising display, the positioning of this image or logo is configurable.

In some embodiments, the content distribution system allows readers to resyndicate content. The widget can expose the ability for viewers of the widget to generate embed strings that allow viewers to view content on their own web sites. For example, the system may display an embed string below the content or a link/button to retrieve an appropriate embed string for displaying the content on the viewer's web site. A content author may provide a web site where potential syndicators can request to become affiliated with the content author so that the syndicator can display the author's content with fewer advertisements or with a customized appearance. For example, the author may allow syndicators to pay a periodic fee (e.g., monthly) for the privilege of displaying the author's content with fewer restrictions.

The content distribution system described herein can operate in many different scenarios, including on mobile devices from which users are more and more using to access content. For example, a publisher of a news or other service for a mobile device may retrieve content from one or more authors using the techniques described herein, and authors may receive payment for use of their content wherever the content goes. In addition, advertisers may contract with the author to have advertisements accompany the content wherever the content is displayed so that advertisers can associate their products with specific content items rather than more broadly with particular publisher's sites.

In some embodiments, the content distribution system may include configurable restrictions related to video in addition to others described herein. For example, a content author may provide a player widget for playing video provided by the author, but may allow certain publishers to access the author's content and use their own video player to play the content. It is common for sites, such as YouTube, to attempt to force playback in a particular player that allows for branding and other functionality (e.g., subsequent videos after one video finishes) to be enforced. The content author may impose similar restrictions on content through an author-provided player but may also relax such restrictions for a publisher that pays to display the publisher's own branding or other functionality.

In some embodiments, the content distribution system provides the ability for publishers to enforce exclusive content with publishers. For example, an author and publisher may agree that the publisher will get an exclusive right to use the content for a set period of time for a particular fee. Thus, the system may request identifying information from each publisher and compare that information with rights stored in one or more content stores to determine whether a particular requesting publisher has access to requested content, and to provide content only to those publishers having sufficient rights. This exclusivity may be time limited. For example, an author may provide his content to an affiliate exclusively for 24 hours and then after 24 hours to any publisher.

From the foregoing, it will be appreciated that specific embodiments of the content distribution system have been described herein for purposes of illustration, but that various modifications may be made without deviating from the spirit and scope of the invention. Accordingly, the invention is not limited except as by the appended claims.

We claim:

1. A computer system for providing content and maintaining control of the content for the content author, the system comprising:
   a processor and memory;
   an author interface component configured to provide an interface between the content author and the system, through which the content author can create content and specify settings for how the content can be consumed by one or more publishers, the author interface further configured to provide the content author an ability to identify at least one category of publisher that is not permitted to consume the content;
   a content store configured to provide persistent storage for content created by the content author;
   a widget distribution component configured to provide an interface through which the one or more publishers can request a widget that displays the content author's content and any associated information;
   a content request component configured to receive requests to access the content author's content from the one or more publishers;
   a publisher identification component configured to identify a publisher from the one or more publishers associated with a particular content request and perform publisher-specific handling of the request for the identified publisher; and
   a content supplement component configured to provide supplemental content associated with the content author's content in response to a request from one of the one or more publishers to access content for display on a site associated with the one of the one or more publishers wherein the supplemental content includes at least one restriction provided by the author that will accompany the content.

2. The system of claim 1 wherein the author interface component is further configured to receive an identification from the content author of one or more publishers that can access the content author's content to embed the content author's content within the site associated with the one of the one or more publishers and restrictions that apply to individual publishers or groups of publishers.

3. The system of claim 1 wherein the widget distribution component is further configured to provide an embeddable web-based control that the one or more publishers can include in a web site to aggregate content from multiple content authors, wherein the multiple content authors maintain control of their respective content.

4. The system of claim 1 wherein the content request component is further configured to receive a content identifier provided by one of the one or more publishers that identifies a content item requested by the one of the one or more publishers.

5. The system of claim 1 wherein the publisher identification component is further configured to identify publisher-specific user experience information that affects how the one of the one or more publishers can display the requested content author's content.

6. The system of claim 1 wherein the publisher identification component is further configured to determine whether an affiliate agreement exists between an identified one of the one or more publishers and the content author and to enforce one or more restrictions imposed by the affiliate agreement.

7. The system of claim 1 wherein the content supplement component is further configured to provide an advertisement with the requested content author's content that the content author is paid to associate with the requested content.

8. A computer system configured to receive online content from a content author for distribution to publishers, the computer system comprising:
   at least one processor and at least one memory device configured to:
   receive content from the content author;
   receive formatting options from the content author for the content, wherein the formatting options specify a manner in which a publisher may display the received content;
   receive content restrictions from the content author that specify how the content can be published, wherein the restrictions identify at least one supplemental item that will accompany the content upon providing the content to a publisher, the content restrictions further limiting a category of publishers capable of publishing the content;
   receive publisher-specific restrictions that specify a difference in how the content can be published for at least one publisher; and
   store the received content, content restrictions and the at least one supplemental item in a content store for later retrieval by a publisher.

9. The computer system of claim 8 wherein store the received content is further configured to create a content identifier associated with the content that publishers can embed in a content page to refer to the content for later requests.

10. A computer-implemented method for receiving online content from a content author for distribution to publishers, the method comprising:
- receiving content from the content author;
- receiving formatting options from the content author for the content, wherein the formatting options specify a manner in which a publisher may display the received content;
- receiving content restrictions from the content author that specify how the content can be published, wherein the restrictions identify at least one supplemental item that will accompany the content upon providing the content to a publisher, the content restrictions further limiting a category of publishers capable of publishing the content;
- receiving publisher-specific restrictions that specify a difference in how the content can be published for at least one publisher; and
- storing the received content and the at least one supplemental item in a content store for later retrieval by a publisher.

11. The method of claim 10 wherein storing the received content further comprises creating a content identifier associated with the content that publishers can embed in a content page to refer to the content for later requests.

* * * * *